US011230373B2

(12) United States Patent
Bustamante et al.

(10) Patent No.: US 11,230,373 B2
(45) Date of Patent: Jan. 25, 2022

(54) ASSEMBLY AND METHOD FOR HELICOPTER ANTI-TORQUE

(71) Applicant: Bell Textron Inc., Fort Worth, TX (US)

(72) Inventors: Marc Bustamante, Montreal (CA); Thuvaragan Senthilnathan, Laval (CA)

(73) Assignee: Textron Innovations Inc., Providence, RI (US)

( * ) Notice: Subject to any disclaimer, the term of this patent is extended or adjusted under 35 U.S.C. 154(b) by 129 days.

(21) Appl. No.: 16/700,011

(22) Filed: Dec. 2, 2019

(65) Prior Publication Data
US 2021/0163127 A1    Jun. 3, 2021

(51) Int. Cl.
*B64C 27/82*    (2006.01)

(52) U.S. Cl.
CPC ...... *B64C 27/82* (2013.01); *B64C 2027/8209* (2013.01); *B64C 2027/8227* (2013.01); *B64C 2027/8236* (2013.01)

(58) Field of Classification Search
CPC ............ B64C 27/82; B64C 2027/8236; B64C 2027/8227; B64C 2027/8209
See application file for complete search history.

(56) References Cited

U.S. PATENT DOCUMENTS

| | | | | |
|---|---|---|---|---|
| 2,420,784 A | * | 5/1947 | Larsen ..................... | B64C 27/82 244/17.21 |
| 2,491,549 A | * | 12/1949 | Brewster ................. | B64C 27/82 416/121 |
| 3,155,341 A | * | 11/1964 | Girard ..................... | B64C 27/26 244/7 R |
| 10,377,479 B2 | | 8/2019 | Parsons et al. | |
| 2008/0237392 A1 | * | 10/2008 | Piasecki ............... | G05D 1/0858 244/6 |
| 2012/0012693 A1 | * | 1/2012 | Thomassey ............. | B64C 27/82 244/17.21 |
| 2012/0160954 A1 | * | 6/2012 | Thomassey ............. | B64C 27/82 244/17.13 |
| 2013/0134256 A1 | * | 5/2013 | Gaillard .................. | B64C 27/82 244/17.21 |
| 2016/0332727 A1 | * | 11/2016 | Waltner .................... | B64C 3/42 |

(Continued)

FOREIGN PATENT DOCUMENTS

| | | | |
|---|---|---|---|
| CN | 107697279 A | * | 2/2018 |
| CN | 107697279 A | | 2/2018 |
| KR | 0151933 B1 | | 10/1998 |

OTHER PUBLICATIONS

Examination Report, Application No. 3,067,212, CIPO, dated Mar. 31, 2021.

*Primary Examiner* — Philip J Bonzell
*Assistant Examiner* — Tye William Abell
(74) *Attorney, Agent, or Firm* — Lawrence Youst PLLC

(57) ABSTRACT

An anti-torque assembly for a helicopter includes a plurality of fans pivotably mountable to a tail boom. The fans have fan blades rotatable about a fan axis. One or more of the fans is pivotable relative to the tail boom to a first configuration. The fan axes in the first configuration have an upright orientation and the fans are operable to one or both of pitch and roll the helicopter. Different fans are operable to generate thrust to provide anti-torque to the helicopter. A method of providing anti-torque and method of changing an attitude of a helicopter are also provided.

27 Claims, 4 Drawing Sheets

(56) References Cited

U.S. PATENT DOCUMENTS

2017/0349273 A1* 12/2017 Parsons ................... B64C 27/82
2017/0349274 A1* 12/2017 Fenny ..................... B64C 27/04
2017/0349276 A1* 12/2017 Fenny ..................... H02K 7/116

* cited by examiner

ASSEMBLY AND METHOD FOR HELICOPTER ANTI-TORQUE

TECHNICAL FIELD

The application relates generally to flight control and, more particularly, to anti-torque systems for helicopters.

BACKGROUND

Counter-torque tail rotors are often used in helicopters and are generally mounted adjacent to vertical fins that provide for aircraft stability. In such a configuration, the helicopter main rotor produces a transverse airflow. The tail rotors can be driven at high angular velocities to provide adequate aerodynamic responses.

Tail rotors are typically oriented such that their thrust vector is perpendicular to the longitudinal axis of the helicopter to provide a restoring moment to the torque of the main rotor. At forward speed, the anti-torque power requirement decreases therefore tail rotors are not required to operate at full power.

SUMMARY

There is provided a helicopter, comprising: a fuselage and a tail boom extending therefrom; and a plurality of fans pivotably mounted to the tail boom, the fans having fan blades rotatable about a fan axis, one or more of the fans being pivotable relative to the tail boom to a first configuration, the fan axes of the fans in the first configuration having an upright orientation.

There is provided an anti-torque assembly for a helicopter having a tail boom, the anti-torque assembly comprising: a plurality of fans pivotably mountable to the tail boom and having fan blades rotatable about a fan axis, one or more of the plurality of fans being pivotable relative to the tail boom to a first configuration, the fan axes of the fans in the first configuration having an upright orientation and operable to one or both of pitch and roll the helicopter, and different fans of the plurality of fans operable to generate thrust to provide anti-torque to the helicopter.

There is provided a method of changing an attitude of a helicopter having fans pivotably mounted at an aft end of a tail boom, the method comprising: pivoting one or more of the fans relative to the tail boom to orient an axis of the one or more fans upright; and generating thrust with the one or more fans in an upward direction or a downward direction to cause the helicopter to one or both of pitch and roll.

There is provided a method of providing anti-torque to a helicopter having fans pivotably mounted at an aft end of a tail boom, the method comprising: generating horizontal thrust with some of the fans to provide anti-torque to the helicopter; pivoting one or more different fans relative to the tail boom to orient an axis of the one or more different fans upright; and generating thrust with the one or more different fans in a vertical direction to cause the helicopter to one or both of pitch and roll.

DESCRIPTION OF THE DRAWINGS

Reference is now made to the accompanying figures in which.

DETAILED DESCRIPTION

Figure 1:
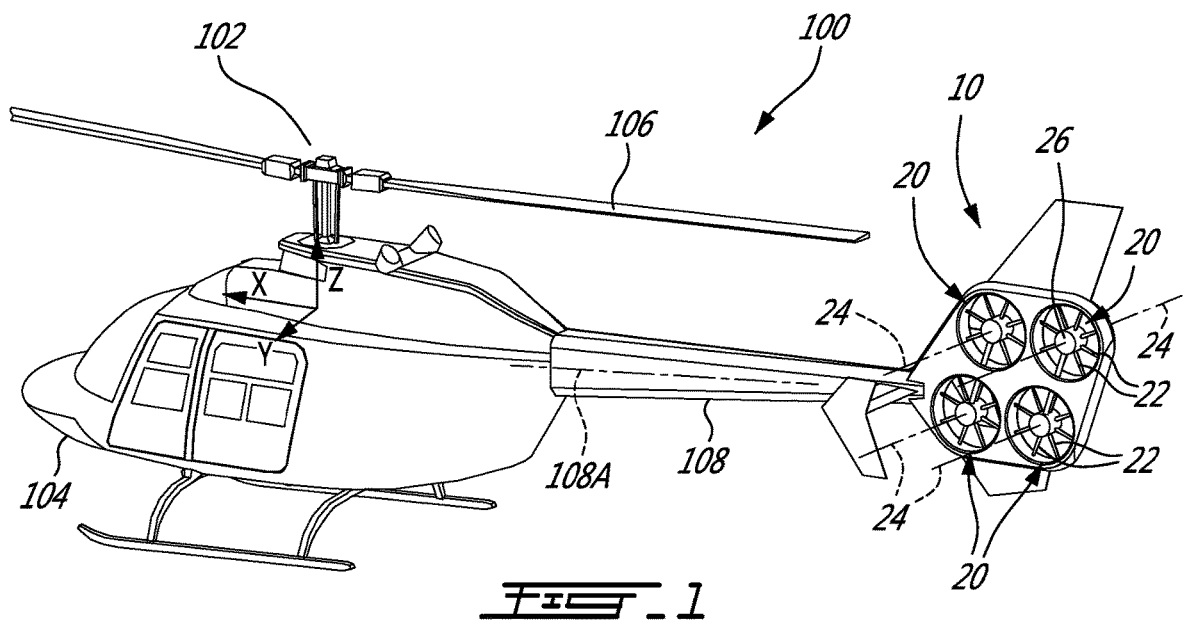
FIG. 1 is a side elevational view of a helicopter having an anti-torque assembly.

FIG. 1 shows a helicopter 100. The helicopter 100 includes a rotary system 102 carried by a fuselage 104. Rotor blades 106 connected to the rotary system 102 rotate and generate thrust to provide flight for the helicopter 100. The rotor blades 106 are controlled by multiple controllers within the fuselage 104. For example, during flight, a pilot can manipulate cyclic controllers for changing a pitch angle of the rotor blades 106 and/or manipulate pedals to provide vertical, horizontal and yaw flight control. The helicopter 100 has a tail boom 108 extending aft from the fuselage 104. The tail boom 108 is an elongated body which extends along a longitudinal tail boom axis 108A, which in FIG. 1 is a center axis. A rear or aft end of the tail boom 108 supports an anti-torque assembly 10 of the helicopter.

In some flight modes, for example hover mode, the helicopter 100 requires anti-torque thrust perpendicular to the centerline of the airframe. The anti-torque assembly 10 provides this anti-torque thrust. As the helicopter 100 increases its forward airspeed, this perpendicular thrust requirement reduces. As the anti-torque thrust requirement reduces, the thrust capable of being generated by the anti-torque assembly 10 can be redirected to optimize power utilization and overall aircraft performance, and to change the attitude of the helicopter 100, as explained in greater detail below. In FIG. 1, the anti-torque assembly 10 is centered on a hub such that a leading edge of the anti-torque assembly 10 is presented to the side of the helicopter 100 toward the tail boom 108. For example, when a single main rotor of the helicopter 100 is rotating counter-clockwise when viewed from above, the leading edge of anti-torque assembly 10 is to the right (starboard) side of the helicopter 100. The anti-torque assembly 10 may be positioned elsewhere.

The attitude of the helicopter 100 is defined relative to the X, Y, Z axes, as the rotational position of the helicopter 100 about one or more of the X, Y, Z axes. Referring to FIG. 1, the yaw axis of the helicopter 100 is the Z axis, the roll axis of the helicopter 100 is the X axis, and the pitch axis of the helicopter 100 is the Y axis. Stated differently, the helicopter 100 can yaw about the Z axis, roll about the X axis and pitch about the Y axis so as to change its attitude, in both hover and flight modes.

The anti-torque assembly 10 in FIG. 1 has a plurality of electrically-driven fans 20. When operational, each of the fans 20 generates thrust along a directional vector in order to contribute to driving the helicopter 100 or to changing its attitude. During the hover or flight modes of the helicopter, one or more of the fans 20 may be used to provide counter or anti-torque force for transversely stabilizing the helicopter 100. Some or all of the fans 20 which are not used for providing anti-torque may contribute to driving the helicopter 100 or to changing its attitude. Some possible examples of using the directional thrust of the fans 20 to contribute to driving the helicopter 100 or to changing its attitude are described in greater detail below. The anti-torque assembly 10 in FIG. 1 has four fans 20. The anti-torque assembly 10 may have more or fewer fans 20. The anti-torque assembly 10 in FIG. 1 has an even number of fans 20 for redundancy purposes. The anti-torque assembly 10 may have an odd number of fans 20.

Referring to FIG. 1, one or more of the fans 20 are pivotably mounted to the tail boom 108. The one or more fans 20 are pivotably mounted to the aft end of the tail boom 108 in order to be most effective when providing anti-torque. In FIG. 1, all of the fans 20 are pivotably mounted to the tail boom 108. The expression "pivotably mounted" means that the fans 20 can be pivoted or rotated relative to the tail boom 108. Such pivoting motion may displace the fans 20 away from the tail boom 108 (referred to as "out-of-plane" or "off-plane" movements, described in greater detail below). Such pivoting motion may alternatively change the orientation of the thrust vector produced by the fans 20 relative to the tail boom 108, while maintaining the position of the fans 20 themselves relative to the tail boom 108 (referred to as "in-plane" movements, described in greater detail below). Different structural mechanisms to permit such motion of the fans 20 are possible, and some possible examples of these are described in greater detail below. In an alternate embodiment, less than all of the fans 20 are pivotably mounted to the tail boom 108, and some of the fans 20 are fixed in position relative to the tail boom 108.

Each of the fans 20 has fan blades 22 that are rotatable about a fan axis 24. The fan blades 22 of each fan 20 extend radially outwardly from a hub 26, which also rotates about the fan axis 24. One or more of the fan blades 20 of a particular fan 20 may have an airfoil shape. One or more of the fan blades 20 of a particular fan 20 may have an airfoil shape with a leading edge, a trailing edge, a tip, a root, and pressure and suction sides. When they rotate about the fan axis 24, the fan blades 22 generate thrust. The thrust generated has a direction represented by a thrust vector. The thrust vector is often, but need not always be, parallel to the fan axis 24. The magnitude of the thrust vector may vary by reducing the rotational speed of the fan blades 22, for example. The orientation of the thrust vector may vary as well. For example, the fan axis 24 of a given one of the fans 20 pivots with the fan 20 relative to the tail boom 108, thereby changing an orientation of the thrust vector produced by the fan blades 22 of that fan 20.

In FIG. 1, the fans 20 are operational to vary the rotational speed of the fan blades 22, and the fan blades 22 have a fixed pitch. The fans 20 are thus able to vary their thrust output by changing the speed of rotation of the fan blades 22. The direction of rotation of the fan blades 22 about the fan axis 24 is reversible, such that each of the fans 20 is able to generate thrust in a first thrust direction and in a second thrust direction opposite to the first thrust direction. In an alternate embodiment, the fan blades 22 of one or more of the fans 20 can vary their pitch and rotate about the fan axis 24 at a fixed rotational speed. In such an embodiment, the fans 20 are thus able to vary their thrust output by changing the pitch of the fan blades 22. In such an embodiment, the direction of thrust generated by the fans 20 is varied by changing the pitch of the fan blades 22. In FIG. 1, the fans 20 are ducted fans 20, such that the fan blades 22 are mounted at their tips to a ring or duct which rotates with the fan blades 22 about the fan axis 24. In an alternate embodiment, the fans 20 are not ducted.

Figures 2A, 2B:
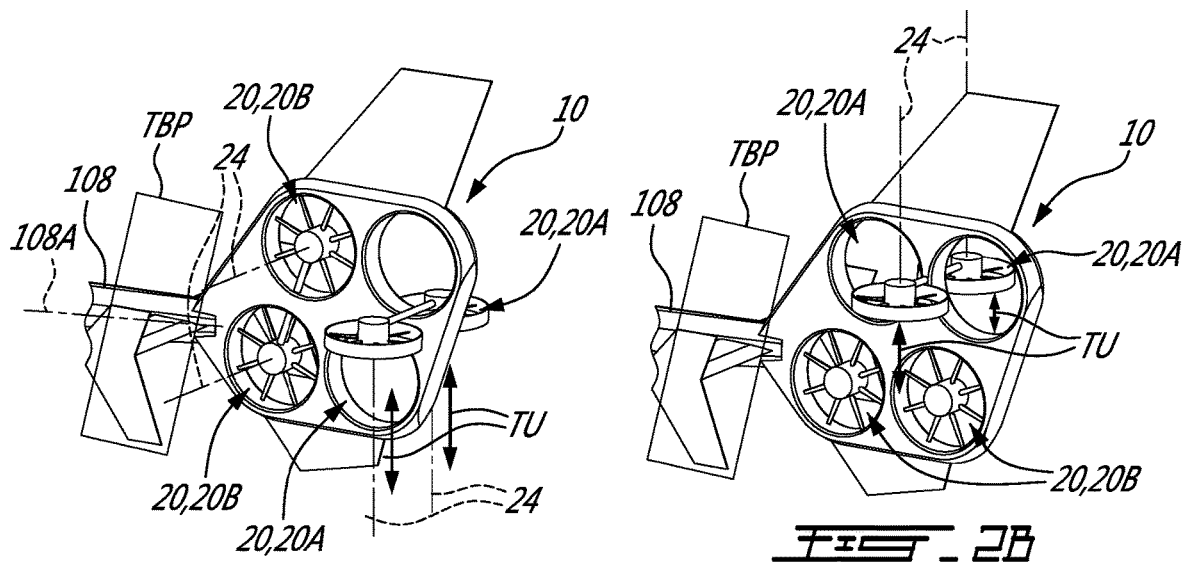
FIG. 2A is a perspective view of the anti-torque assembly of FIG. 1, some of the fans of the anti-torque assembly shown in a first configuration.
FIG. 2B is another perspective view of the anti-torque assembly of FIG. 1, some of the fans of the anti-torque assembly shown in a first configuration.

Referring to FIG. 2A, one or more of the fans 20 are pivotable relative to the tail boom 108 to a first configuration. In the first configuration, the fan axes 24 of the fans 20 have an upright orientation. In the first configuration, the fan axes 24 of the fans 20 have a vertical orientation. The thrust vector produced by the fan blades 22 of such fans 20 is thus oriented upwardly or downwardly. It will be appreciated that the terms "upright", "vertical", "up" and "down" do not require the fan axes 24 to be perfectly normal to a horizontal plane, and that the fan axes 24 may have a generally upright orientation. The fan blades 22 in the first configuration rotate in planes that are normal to the fan axes 24, and these planes have a generally horizontal orientation.

As the helicopter 100 increases its forward airspeed, the perpendicular anti-torque thrust requirement of the fans 20 reduces. By pivoting some or all of the fans 20 relative to the tail boom 108 to orient their fan axes 24 upright, the anti-torque assembly 10 is able to use these fans 20 at their full potential. By using these fans 20 at their nominal capacity and changing the orientation of their fan axes 24, the orientation of the total thrust vector produced by the anti-torque assembly 10 may be modified. During forward flight of the helicopter 100, changing the orientation of the total thrust vector produced by the anti-torque assembly 10 to be more upright may allow for causing the helicopter to pitch about the Y axis, and/or roll about the X axis. The pivoting fans 20 of the anti-torque assembly 10 thus allow for changing the attitude of the helicopter 100.

Referring to FIG. 2A, one or more of the fans 20 which are pivotable relative to the tail boom 108 are pivotable independently of each other. For example, and as shown in FIG. 2A, all of the fans 20 are pivotable relative to the tail boom 108. Two of the aft-most fans 20A are pivoted relative to the tail boom 108 to be in the first configuration where their fan axes 24 are oriented upright, while the other two fans 20B have not been pivoted relative to the tail boom 108 such that their fan axes 24 have a substantially horizontal orientation. Thus the pivotable fans 20 are pivotable independently of the other fans 20. Despite the pivotable fans 20 being independently pivotable, their independent movements may still be coordinated to achieve a desired effect. For example, and referring to FIG. 2A, the one or more fans 20 which are pivotable relative to the tail boom 108 may be pivoted simultaneously together in pairs relative to the tail boom 108.

This independent but still coordinated pivoting movement of the fans 20 may be used so that thrust vectors produced by the fan blades 22 achieve the desired effect on flight or attitude control of the helicopter 100. For example, in FIG. 2A, the fans 20A which are shown pivoted relative to the tail boom 108 to the first configuration are operable to generate thrust to change an attitude of the helicopter 100, specifically to cause the helicopter to pitch and/or roll, during either hover or flight modes, to affect the pilots field of view, for example. To cause the helicopter 100 to pitch up or down about the Y axis, the fan blades 22 of the fans 20A may generate a corresponding upright thrust vector TU. Similarly, to cause the helicopter 100 to roll left or right about the X axis, the upright thrust vector TU generated by the fan blades 22 of one of the fans 20A may be different (in magnitude and/or direction) than the upright thrust vector TU generated by the fan blades 22 of the other fan 20A. The other fans 20B are positioned in the plane of the tail boom 108 and are operable to generate thrust to provide anti-torque to the helicopter 100, during either hover or flight modes.

In FIG. 2A, the fans 20A shown pivoted to the first configuration are "off-plane" or "out-of-plane" with the tail boom 108. The tail boom 108 defines a tail boom plane TBP which is upright. The tail boom axis 108A lies in the tail boom plane TBP, and extends along the tail boom plane TBP. The fan axes 24 of the fans 20A in the first configuration are spaced apart horizontally from the tail boom plane TBP. The fan axes 24 of the fans 20A in the first configuration are spaced apart horizontally from the tail boom 108. The fan axes 24 of the fans 20A are parallel to the tail boom plane TBP in FIG. 2A. The fans 20A thus pivot relative to the tail boom 108 such that they are rotated out of the tail boom plane TBP such that their fan axes 24 are both parallel to, and spaced apart from, the tail boom plane TBP. In FIG. 2A, one of the fans 20A shown pivoted to the first configuration is positioned on one lateral side of the tail boom plane TBP, while the other one of the fans 20A shown pivoted to the first configuration is positioned on the other lateral side of the tail boom plane TBP. The fan axes 24 of the fans 20A are laterally spaced-apart. The fan axes 24 of the fans 20A are disposed on opposite sides of the tail boom plane TBP. The fans 20A are symmetrically disposed about the tail boom plane TBP. The fans 20A may be pivoted simultaneously to the first configurations on either side of the tail boom plane 20A.

FIG. 2B shows the fans 20 of the anti-torque assembly 10 in a different arrangement. The fans 20 in FIG. 2B are similar to those shown in FIG. 2A and described above, and the description of the fans 20 in FIG. 2A applies mutatis mutandis to the fans 20 in FIG. 2B. In FIG. 2B, two of the upper-most fans 20A are pivoted relative to the tail boom 108 to be in the first configuration where their fan axes 24 are oriented upright, while the other lower-most two fans 20B have not been pivoted relative to the tail boom 108 such that their fan axes 24 have a substantially horizontal orientation. In FIG. 2B, the fans 20A are pivotable simultaneously together as a pairing relative to the tail boom 108. The fan axes 24 of the fans 20A are disposed on opposite sides of the tail boom plane TBP. In FIG. 2B, the fans 20A in the first configuration are operable to generate thrust to change an attitude of the helicopter 100, specifically to cause the helicopter to pitch and/or roll, during either hover or flight modes. To cause the helicopter 100 to pitch up or down about the Y axis, the fan blades 22 of the fans 20A on opposite sides of the tail boom plane TBP may generate a corresponding upright thrust vector TU. The upright thrust vector TU generated by each of fans 20A may be the same in magnitude and direction. Similarly, to cause the helicopter 100 to roll left or right about the X axis, the upright thrust vector TU generated by the fan blades 22 of one of the fans 20A may be different (in magnitude and/or direction) than the upright thrust vector TU generated by the fan blades 22 of the other fan 20A. The other fans 20B are positioned in the plane of the tail boom 108 and are operable to generate thrust to provide anti-torque to the helicopter 100, during either hover or flight modes.

Figure 2C:
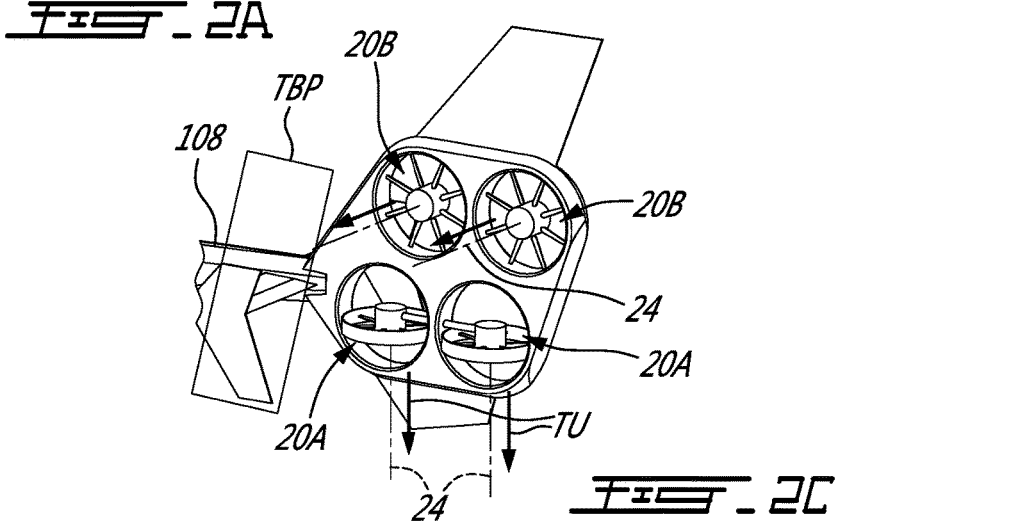
FIG. 2C is another perspective view of the anti-torque assembly of FIG. 1, some of the fans of the anti-torque assembly shown in a first configuration.

FIG. 2C shows the fans 20 of the anti-torque assembly 10 in a different arrangement. In FIG. 2C, the fans 20A shown pivoted to the first configuration are "in-plane" with the tail boom 108. The fan axes 24 of the fans 20A shown in the first configuration are aligned with the tail boom plane TBP. The fan axes 24 of the fans 20A are parallel to tail boom plane TBP. The fan axes 24 of the fans 20A have the same lateral position as the tail boom plane TBP. The fans 20A in FIG. 2C are thus pivotable in the same plane as the tail boom 108 such that their fan axes 24 lie in the plane of the boom 108 or are slightly laterally offset therefrom when the fans 20A are in the first configuration.

The fans 20 in FIG. 2C are similar to those shown in FIG. 2A and described above, and the description of the fans 20 in FIG. 2A applies mutatis mutandis to the fans 20 in FIG. 2C. In FIG. 2C, two of the lower-most fans 20A are pivoted relative to the tail boom 108 to be in the first configuration where their fan axes 24 are oriented upright, while the other upper-most fans 20B have not been pivoted relative to the tail boom 108 such that their fan axes 24 have a substantially horizontal orientation. In FIG. 2C, the fans 20A are pivotable simultaneously together as a pairing relative to the tail boom 108. The fan axes 24 of the fans 20A shown in the first configuration lie in the tail boom plane TBP. In FIG. 2C, the fans 20A in the first configuration are operable to generate thrust to change an attitude of the helicopter 100, specifically to cause the helicopter to pitch, during either hover or flight modes. To cause the helicopter 100 to pitch up or down about the Y axis, the fan blades 22 of the fans 20A may generate a corresponding upright thrust vector TU. The upright thrust vector TU generated by each of fans 20A may be the same in magnitude and direction, or different in magnitude and direction. The other fans 20B are positioned in the plane of the tail boom 108 and are operable to generate thrust to provide anti-torque to the helicopter 100, during either hover or flight modes. In an embodiment, the fans 20A may be pivoted such that their fan axes 24 are transverse to the tail boom plane TBP but not horizontal. Such an orientation of the fans 20A may cause the helicopter 100 to simultaneously pitch about the Y axis and roll about the X axis during flight modes.

Figure 3A:
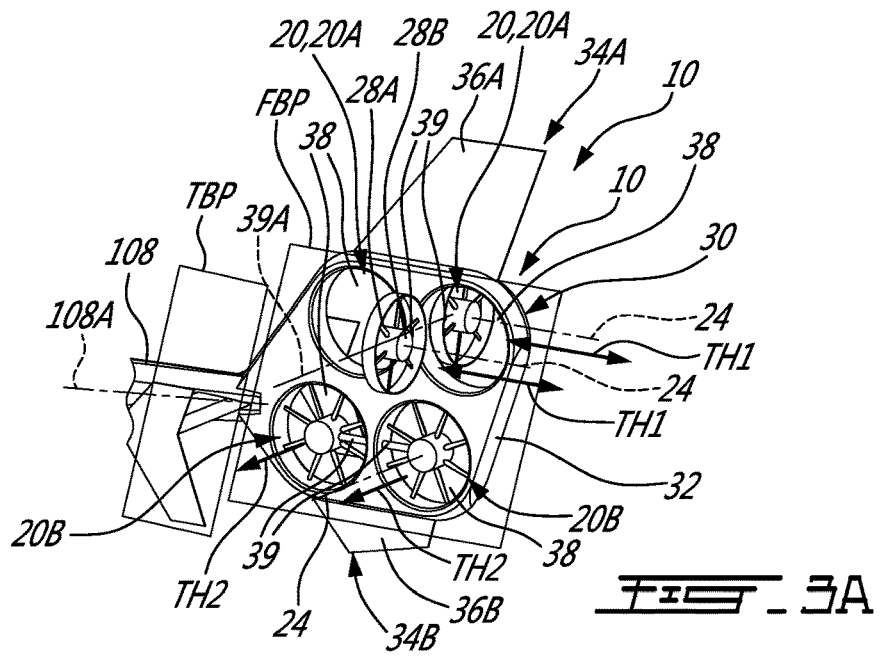
FIG. 3A is a perspective view of the anti-torque assembly of FIG. 1, some of the fans of the anti-torque assembly shown in a second configuration.

FIG. 3A shows the fans 20 of the anti-torque assembly 10 in a different arrangement. In FIG. 3A, one or more of the fans 20 are pivotable relative to the tail boom 108 to a second configuration. In the second configuration, the fan axes 24 of the fans 20 have a horizontal orientation. In the second configuration, the fan axes 24 of the fans 20 have an orientation being substantially parallel to a ground surface.

The thrust vector produced by the fan blades 22 of such fans 20 is thus oriented horizontally. It will be appreciated that the terms "horizontally" and "parallel to the ground surface" do not require the fan axes 24 to be perfectly normal to a vertical plane, and that the fan axes 24 may have a generally horizontal orientation. The fan axes 24 of the fans 20 in the second configuration are parallel to the tail boom axis 108A. The fan blades 22 in the second configuration rotate in planes that are normal to the fan axes 24, and these planes have a generally vertical or upright orientation. The fan blades 22 in the second configuration rotate in planes that are normal to the fan axes 24, and these planes are transverse to the upright tail boom plane TBP. The fans 20 which are pivotable to the second configuration in FIG. 3A are the same fans which are pivotable to the first configuration. Thus, all of the fans 20 are pivotable between both the first and second configurations. In an alternate embodiment, the one or more of the fans 20 that are pivotable to the second configuration are different from the one or more fans 20 that are pivotable to the first configuration, and vice versa.

The fans 20 in FIG. 3A are similar to those shown in FIG. 2A and described above, and the description of the fans 20 in FIG. 2A applies mutatis mutandis to the fans 20 in FIG. 3A. In FIG. 3A, two of the upper-most fans 20A are pivoted relative to the tail boom 108 to be in the second configuration where their fan axes 24 are oriented horizontally, while the other lower-most two fans 20B have not been pivoted relative to the tail boom 108 such that their fan axes 24 also have a substantially horizontal orientation. The fan axes 24 of the fans 20A,20B shown in FIG. 3A are each normal to a given plane, and the planes are transverse to each other. The fan axes 24 of the fans 20A,20B shown in FIG. 3A are transverse to each other. In FIG. 3A, the fans 20A are pivotable simultaneously together as a pairing relative to the tail boom 108. The fan axes 24 of the fans 20A are disposed on opposite sides of the tail boom plane TBP. In FIG. 3A, the fans 20A in the second configuration are operable to generate a first horizontal thrust vector TH1 to contribute to driving the helicopter 100 in forward flight. The fans 20A in the second configuration may also be operable to generate thrust in a direction opposite to the first horizontal thrust vector TH1 to contribute to decelerating or braking the helicopter 100 in flight or taxi modes. The other fans 20B are positioned in the plane of the tail boom 108 and are operable to generate a second horizontal thrust vector TH2 to provide anti-torque to the helicopter 100, during either hover or flight modes. Thus, in FIG. 3A, some of the fans 20 are used to push the helicopter 100 and the other fans 20 are used to simultaneously give anti-torque thrust. During forward flight, when the anti-torque requirements are lower, this may allow for using all the fans 20 at their full potential.

The fans 20 may be arranged to provide the anti-torque assembly 10 with thrust that functions to both change the attitude of the helicopter 100, and to drive or decelerate the helicopter 100 in flight. For example, in FIG. 3A, two of the fans 20A may be pivoted relative to the tail boom 108 to be in the second configuration where their fan axes 24 are oriented horizontally, while the other two fans 20B may be pivoted relative to the tail boom 108 to be in the first configuration where their fan axes 24 are oriented upright. The fans 20B in the first configuration are operable to generate thrust to change an attitude of the helicopter 100 (e.g. one or both of pitch and roll), while the fans 20A in the second configuration are operable to generate thrust to contribute to driving or braking the helicopter 100. The fans 20A may thus provide additional thrust to the helicopter 100 to increase its speed and/or range. In such an arrangement of the fans 20, the fans 20 provide little or negligible anti-torque. Such an arrangement of the fans 20 may be used in the forward flight mode of the helicopter 100, where the anti-torque requirement may be negligible or may be satisfied by other structural or rotating components of the helicopter 100, such that the fans 20 may be used to their full potential. Thus, one, some or all of the fans 20 are pivotable between both the first and second configurations, and to any position between the first and second configurations.

Figure 3B:
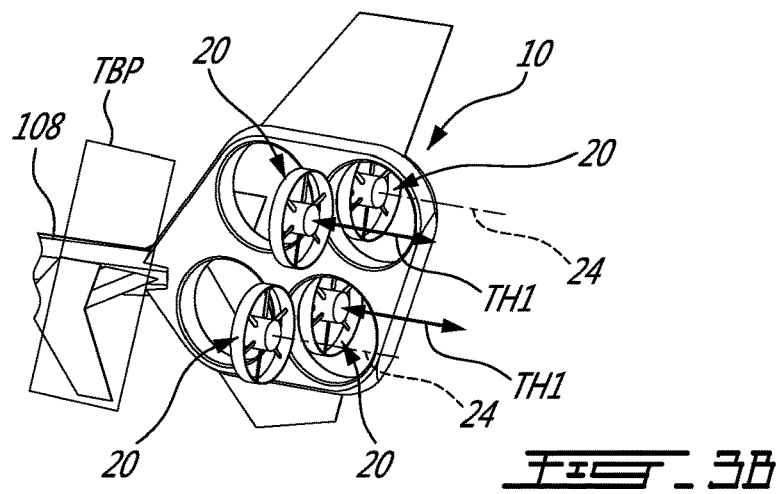
FIG. 3B is another perspective view of the anti-torque assembly of FIG. 1, all of the fans of the anti-torque assembly shown in a second configuration.

FIG. 3B shows the fans 20 of the anti-torque assembly 10 in a different arrangement. The fans 20 in FIG. 3B are similar to those shown in FIG. 2A and described above, and the description of the fans 20 in FIG. 2A applies mutatis mutandis to the fans 20 in FIG. 3B. In FIG. 3B, all of the four fans 20 are pivoted relative to the tail boom 108 to be in the second configuration where their fan axes 24 are oriented horizontally. In FIG. 3B, the fans 20 are pivotable simultaneously together as two separate pairings relative to the tail boom 108. The fan axes 24 of the fans 20 are disposed on opposite sides of the tail boom plane TBP. In FIG. 3B, all of the fans 20 in the second configuration are operable to generate the first horizontal thrust vector TH1 to contribute to driving the helicopter 100 in forward flight. The fans 20 in the second configuration may also be operable to generate thrust in a direction opposite to the first horizontal thrust vector TH1 to contribute to decelerating or braking the helicopter 100 in flight or taxi modes. Thus, in FIG. 3B, all of the fans 20 are used to push the helicopter 100. During forward flight, when the anti-torque requirements are lower, this may allow for using all the fans 20 at their full potential.

Figure 3C:
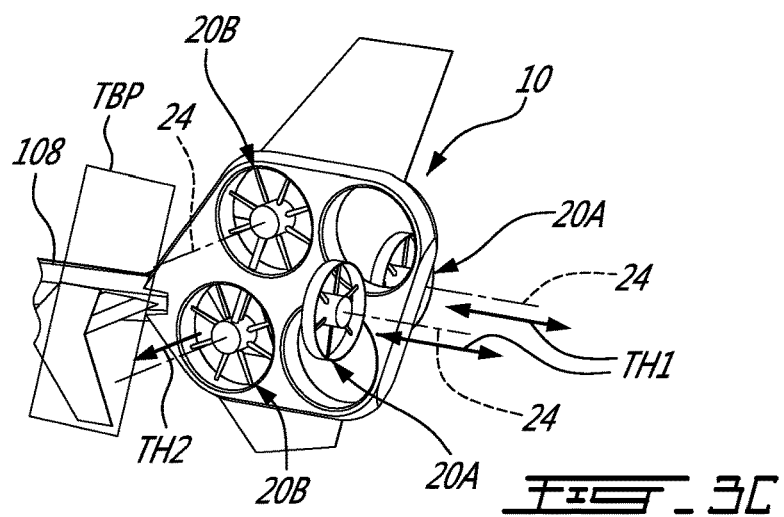
FIG. 3C is another perspective view of the anti-torque assembly of FIG. 1, some of the fans of the anti-torque assembly shown in a second configuration.

FIG. 3C shows the fans 20 of the anti-torque assembly 10 in a different arrangement. The fans 20 in FIG. 3C are similar to those shown in FIG. 2A and described above, and the description of the fans 20 in FIG. 2A applies mutatis mutandis to the fans 20 in FIG. 3C. In FIG. 3C, two of the aft-most fans 20A are pivoted relative to the tail boom 108 to be in the second configuration where their fan axes 24 are oriented horizontally, while the other forward-most fans 20B have not been pivoted relative to the tail boom 108 such that their fan axes 24 also have a substantially horizontal orientation. The fan axes 24 of the fans 20A,20B shown in FIG. 3C are each normal to a given plane, and the planes are transverse to each other. The fan axes 24 of the fans 20A,20B shown in FIG. 3C are transverse to each other. In FIG. 3C, the fans 20A are pivotable simultaneously together as a pairing relative to the tail boom 108. The fan axes 24 of the fans 20A are disposed on opposite sides of the tail boom plane TBP. In FIG. 3C, the fans 20A in the second configuration are operable to generate a first horizontal thrust vector TH1 to contribute to driving the helicopter 100 in forward flight. The fans 20A in the second configuration may also be operable to generate thrust in a direction opposite to the first horizontal thrust vector TH1 to contribute to decelerating or braking the helicopter 100 in flight or taxi modes. The other fans 20B are positioned in the plane of the tail boom 108 and are operable to generate a second horizontal thrust vector TH2 to provide anti-torque to the helicopter 100, during either hover or flight modes. Thus, in FIG. 3C, some of the fans 20 are used to push the helicopter 100 and the other fans 20 are used to simultaneously give anti-torque thrust. During forward flight, when the anti-torque requirements are lower, this may allow for using all the fans 20 at their full potential.

Referring to FIGS. 1 to 3C, and in particular to FIG. 3A, the tail boom 108 has a fin 30 at an aft end of the tail boom 108. The fin 30 is a vertically-extending body which is shaped to provide anti-torque stability to the helicopter 100 during forward flight. When the forward flight speed of the helicopter 100 is sufficiently high, most of the anti-torque is an aerodynamically-generated force caused by the passage of air across the surfaces of the fin 30. The fin 30 may have any suitable shape to achieve such functionality. In FIG. 3A, the fin 30 has a main fin body 32 which is positioned between an upper end 34A of the fin 30 and a lower end 34B of the fin 30. The upper end 34A has a airfoil-shaped fin extension 36A extending upwardly from the fin body 32, and the lower end 34B has a fin stub 36B extending downwardly from the fin body 32. The fin body 32 has a thickness that is greater than the thickness of the fin extension 36A and the fin stub 36B. The upright walls of the fin body 32 define, and lie in, a fin body plane FBP which is upright. Multiple fan openings 38 are formed in the fin body 32, and extend laterally through the fin body 32 between its laterally-opposed walls. Each of the fans 20 is positioned in one of the fan openings 38. The fan openings 38 in the fin body 32 are delimited by inner walls of the fin body 32, which help to draw air into and through the fans 20.

Referring to FIG. 3A, each of the fans 20 is mounted to a strut 39 which is itself mounted to the fin body 32. The struts 39 extend from the fin body 32 to the fans 20, and are pivotable relative to the fin body 32 to displace the fans to, and between, the first and second configurations. The struts 39 may be any mechanical hinge-like structure that is capable of such functionality. In FIG. 3A, the struts 39 are elongated bodies extending along a strut axis 39A, and which are pivotably mounted to the fin body 32. In the arrangement of the fans 20 shown in FIG. 3A, the struts 39 are pivotable relative to the fin body 30 in order to displace the fans 20 to be spaced laterally from the fin body plane FBP, in both the first and second configurations of the fans 20. In the arrangement of the fans 20 shown in FIG. 3A, the struts 39 are pivotable relative to the fin body 30 in order to displace the fans 20 to be spaced on opposite lateral sides of the fin body plane FBP, in both the first and second configurations of the fans 20. The struts 39 are pivotable relative to the fin body 32 to orient the struts 39 and their strut axes 39A transverse to the fin body plane FBP. The struts 39 are pivotable relative to the fin body 32 to orient the struts 39 and their strut axes 39A normal to the fin body plane FBP. The fan axes 24 of the fans 20A shown in the second configuration in FIG. 3A have a horizontal orientation and are parallel to the fin body plane FBP. In FIG. 3A, the fan blades 22 of the fans 20A rotate in planes normal to the fan axes 24. These planes have an upright orientation like the fin body plane FBP, and intersect and are transverse to the fin body plane FBP. In FIG. 3A, the fan axes 24 of the fans 20A are parallel to the tail boom axis 108A. In FIG. 3A, the struts 39 are rotatable about their strut axis 39A. This allows a given one of the struts 39 to transition its corresponding fan 20 between the first and second configurations. For example, the struts 39 of the upper-most fans 20A shown in the second configuration in FIG. 3A may rotate about the strut axes 39A to position the same upper-most fans 20A in the first configuration shown in FIG. 2B.

Referring to FIG. 3A, the fans 20 are driven by an electric power source. Each of the fans 20 has a motor housing 28A which is pivotably mounted to the tail boom 108, or to a component extending therefrom such as a strut 39. The motor housing 28A therefore pivots with the remainder of the fan 20 relative to the tail boom 108. The motor housing 28A houses an electric motor 28B, and the fan blades 22 extend radially outwardly from the motor housing 28A. The electric motor 28B drives the fan blades 22 to rotate about the fan axis 24. The arrangement of the fans 20 of the anti-torque assembly 10 may thus be referred to as Electrically-Distributed Anti-Torque, or "EDAT". In this regard, reference is made to US patent application 2017/0349276 A1 naming Bell Helicopter Textron Inc. as the assignee, the entire contents of which are incorporated by reference herein. EDAT may be a hybrid mechanical-electric system, which uses mechanical power off the main engine and converts it for use by the electric motors 28B. Each fan 20 is controlled or driven by its own electric motor 28B. Each fan 20 is thus able to generate thrust independently of the other fans 20. Since the fans 20 are electrically powered and do not require a rigid mechanical drive to supply power, they are free to rotate or pivot relative to the tail boom 108. In an embodiment, the range of pivoting motion of the fan axes 24 of the fans 20 is 0° to 90° relative to an upright plane extending through the tail boom axis 108A. Using such distributed electric propulsion and flight control technology, each electric motor 28B may be controlled independently to vary the thrust produced by each fan 20, and thereby position the anti-torque assembly 10 for optimum overall thrust, in both direction and magnitude.

Figure 4A:
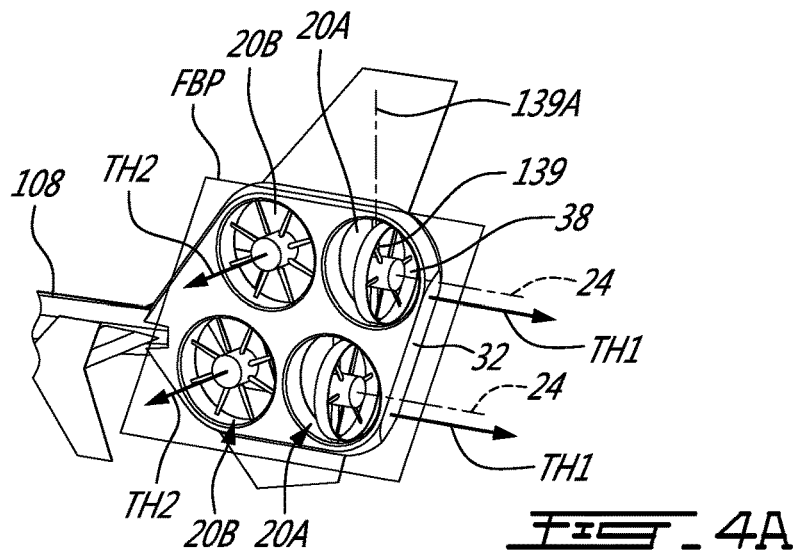
FIG. 4A is a perspective view of the anti-torque assembly of FIG. 1, some of the fans of the anti-torque assembly shown in a second configuration.
Figure 4B:
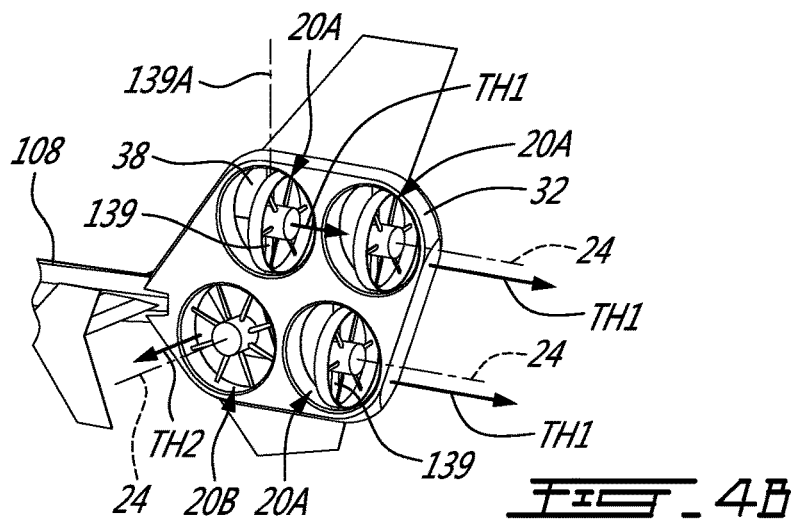
FIG. 4B is another perspective view of the anti-torque assembly of FIG. 1, some of the fans of the anti-torque assembly shown in a second configuration.
Figure 4C:
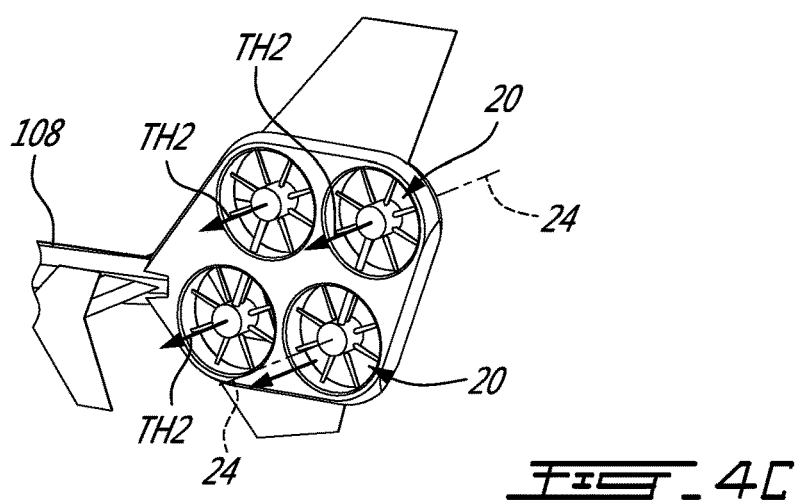
FIG. 4C is another perspective view of the anti-torque assembly of FIG. 1, all of the fans of the anti-torque assembly shown in an anti-torque configuration.

FIGS. 4A to 4C show a different arrangement of the struts 139. In FIGS. 4A to 4C, the fans 20 shown pivoted to the second configuration are "in-plane" with the tail boom 108. The fans 20 in FIGS. 4A to 4C are similar to those shown in FIG. 2A and described above, and the description of the fans 20 in FIG. 2A applies mutatis mutandis to the fans 20 in FIGS. 4A to 4C. The struts 139 in FIGS. 4A to 4C are similar to those shown in FIG. 3A and described above, and except where specific differences are described below, the description of the struts 39 in FIG. 3A applies mutatis mutandis to the struts 139 in FIGS. 4A to 4C. In FIGS. 4A to 4C, the struts 139 are elongated bodies extending along strut axes 139A and across the fan openings 38 in the fin body 32. The struts 139 are mounted to suitable bearings in the walls circumscribing the fan openings 38 to allow the struts 139 to rotate about their strut axes 139A. The struts 139 are pivotable relative to the tail boom 108 by being pivotable about their strut axes 139A. The struts 139 are pivotable relative to the fin body 32 to displace the fans 20 to position the fan axes 24 in the fin body plane FBP. The strut axes 139A lie in the fin body plane FBP. An orientation of the struts 139 and their strut axes 139A is parallel to the fin body plane FBP when the fans 20 are in the second configuration, and when they are producing anti-torque.

FIG. 4A shows the fans 20 of the anti-torque assembly 10 in a different arrangement. In FIG. 4A, two of the aft-most fans 20A are pivoted relative to the tail boom 108 to be in the second configuration where their fan axes 24 are oriented horizontally, while the other forward-most fans 20B have not been pivoted relative to the tail boom 108 such that their fan axes 24 also have a substantially horizontal orientation. The fan axes 24 of the fans 20A,20B shown in FIG. 4A are each normal to a given plane, and the planes are transverse to each other. The fan axes 24 of the fans 20A,20B shown in FIG. 4A are transverse to each other. In FIG. 4A, the fans 20A are pivotable simultaneously together as a pairing relative to the tail boom 108. The fan axes 24 of the fans 20A are disposed in, and/or parallel to, the fin body plane FBP. In FIG. 4A, the fans 20A in the second configuration are operable to generate a first horizontal thrust vector TH1 to contribute to driving the helicopter 100 in forward flight. The fans 20A in the second configuration may also be operable to generate thrust in a direction opposite to the first horizontal thrust vector TH1 to contribute to decelerating or braking the helicopter 100 in flight or taxi modes. The other fans 20B are positioned in the fin body plane FBP and are operable to generate a second horizontal thrust vector TH2 to provide anti-torque to the helicopter 100, during either hover or flight modes. Thus, in FIG. 4A, some of the fans 20A are used to push the helicopter 100 and the other fans 20B are used to simultaneously give anti-torque thrust. During forward flight, when the anti-torque requirements are lower, this may allow for using all the fans 20 at their full potential.

FIG. 4B shows the fans 20 of the anti-torque assembly 10 in a different arrangement. In FIG. 4B, two of the aft-most fans 20A and the upper and forward-most fan 20A are pivoted relative to the tail boom 108 to be in the second configuration where their fan axes 24 are oriented horizontally, while the remaining forward-most fan 20B has not been pivoted relative to the tail boom 108 such that its fan axis 24 also has a substantially horizontal orientation. In FIG. 4B, the fans 20A are pivotable simultaneously together relative to the tail boom 108. The fan axes 24 of the fans 20A are disposed in, and/or parallel to, the fin body plane FBP. In FIG. 4B, the fans 20A in the second configuration are operable to generate a first horizontal thrust vector TH1 to contribute to driving the helicopter 100 in forward flight. The fans 20A in the second configuration may also be operable to generate thrust in a direction opposite to the first horizontal thrust vector TH1 to contribute to decelerating or braking the helicopter 100 in flight or taxi modes. The fans 20A in the second configuration may be controlled such that the magnitude of the first horizontal thrust vectors TH1 generated by the uppermost fans 20A is different than the magnitude of the first horizontal thrust vector TH1 generated by the lower-most fan 20A, so as to cause the helicopter to pitch about the Y axis. The fan 20B is positioned in the fin body plane FBP and is operable to generate a second horizontal thrust vector TH2 to provide anti-torque to the helicopter 100, during either hover or flight modes. Thus, in FIG. 4B, some of the fans 20A are used to push the helicopter 100 and/or change its pitch, and the other fan 20B is used to simultaneously give anti-torque thrust. During forward flight, when the anti-torque requirements are lower, this may allow for using all the fans 20 at their full potential.

FIG. 4C shows the fans 20 of the anti-torque assembly 10 in a different arrangement. In FIG. 4C, all of the fans 20 have not been pivoted relative to the tail boom 108 such that their fan axes 24 all have a substantially horizontal orientation. The fans 20 are positioned in the fin body plane FBP and are operable to generate a second horizontal thrust vector TH2 to provide anti-torque to the helicopter 100, during either hover or flight modes. Thus, in FIG. 4C, all of the fans 20A are used to provide anti-torque thrust or to cause the helicopter to yaw about the Z axis.

Figure 5A:
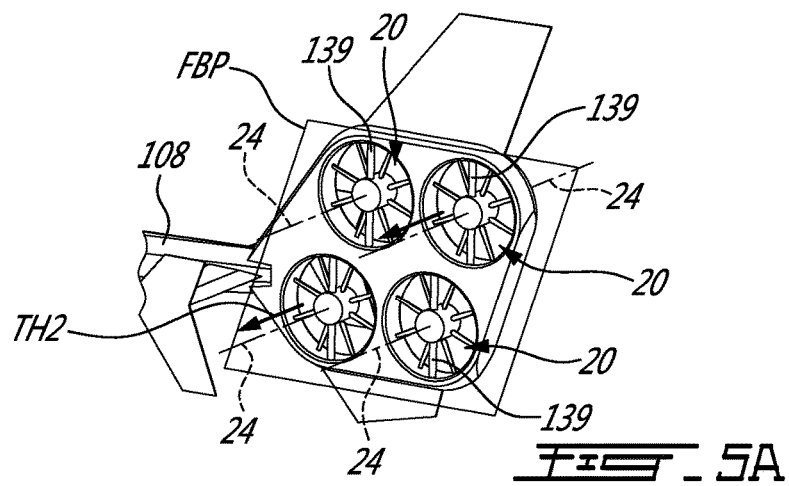
FIG. 5A is another perspective view of the anti-torque assembly of FIG. 1, all of the fans of the anti-torque assembly shown in an anti-torque configuration.
Figures 5B, 5C, 5D, 5E:
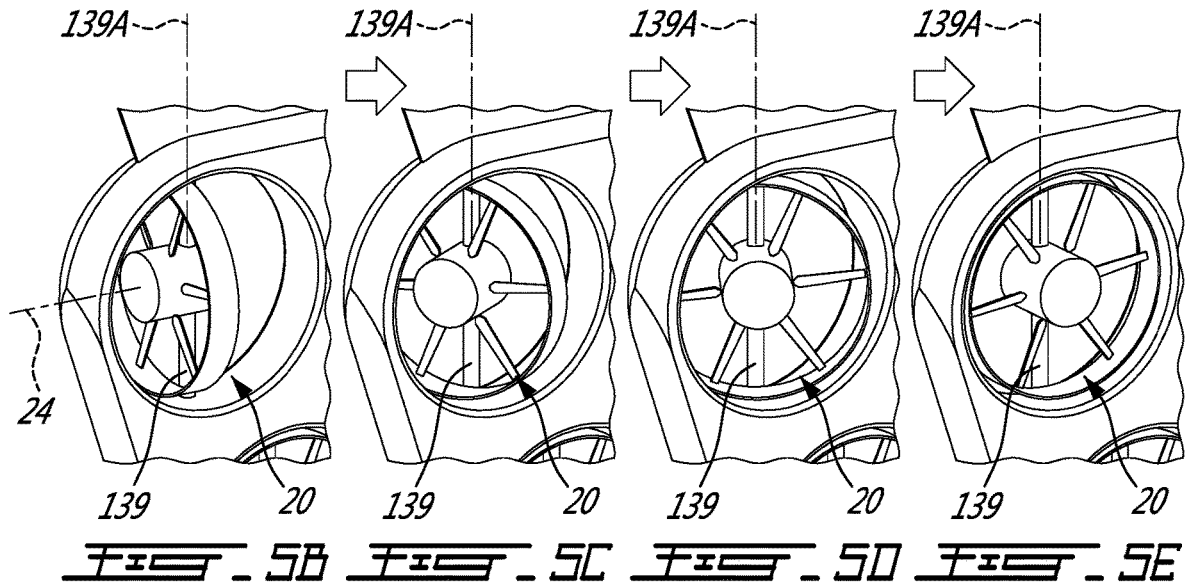
FIG. 5B is a perspective view of one of the fans of the anti-torque assembly of FIG. 1, shown in a second configuration.
FIG. 5C is a perspective view of the fan of FIG. 5B in transition from the second configuration toward an anti-torque configuration.
FIG. 5D is a perspective view of the fan of FIG. 5B in further transition from the second configuration toward the anti-torque configuration.
FIG. 5E is a perspective view of the fan of FIG. 5B in the anti-torque configuration.
Figure 5F:
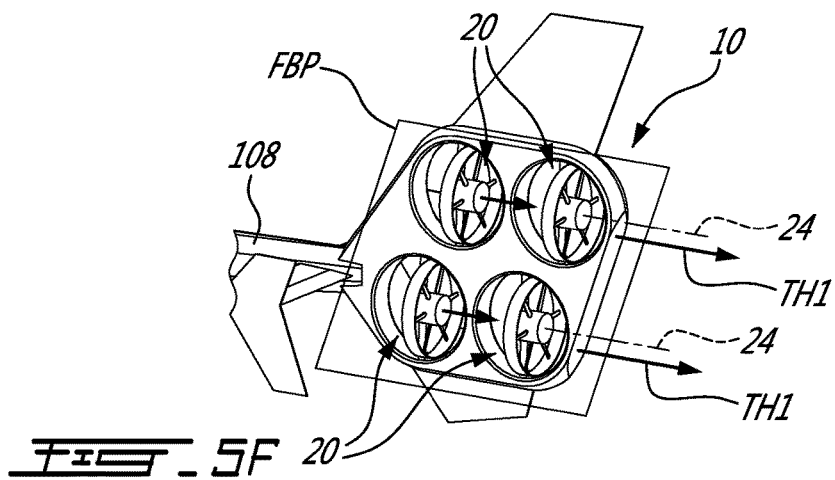
FIG. 5F is a perspective view of the anti-torque assembly of FIG. 1, all of the fans of the anti-torque assembly shown in the second configuration.

FIGS. 5A to 5F show an arrangement of the struts 139 similar to that shown in FIGS. 4A to 4C. In FIG. 5F, the fans 20 shown pivoted to the second configuration are "in-plane" with the tail boom 108. The fans 20 in FIGS. 5A to 5F are similar to those shown in FIG. 2A and described above, and the description of the fans 20 in FIG. 2A applies mutatis mutandis to the fans 20 in FIGS. 5A to 5F. The struts 139 in FIGS. 5A to 5F are similar to those shown in FIG. 4A and described above, and the description of the struts 139 in FIG. 4A applies mutatis mutandis to the struts 139 in FIGS. 5A to 5F.

FIG. 5A shows the fans 20 of the anti-torque assembly 10 in a different arrangement. In FIG. 5A, all of the fans 20 have not been pivoted relative to the tail boom 108 such that their fan axes 24 all have a substantially horizontal orientation. The fans 20 are positioned in the fin body plane FBP and are operable to generate a second horizontal thrust vector TH2 to provide anti-torque to the helicopter 100, during either hover or flight modes. Thus, in FIG. 5A, all of the fans 20A are used to provide anti-torque thrust or to cause the helicopter to yaw about the Z axis.

FIGS. 5B to 5E show the pivoting movement relative to the tail boom 108 of one of the fans 20 shown in FIG. 5A. In FIG. 5B, the fan 20 is shown pivoted relative to the tail boom 108 to be in the second configuration where its fan axis 24 is oriented horizontally. In FIG. 5C, the fan 20 is pivoted away from the second configuration and toward the anti-torque configuration by pivoting the strut 139 relative to the tail boom 108 and about the strut axis 139A. In FIG. 5D, the fan 20 continues to pivot away from the second configuration and toward the anti-torque configuration by continuing to pivot the strut 139 relative to the tail boom 108 and about the strut axis 139A. Finally, in FIG. 5E, the fan 20 has been fully pivoted to the anti-torque configuration.

FIG. 5F shows the fans 20 of the anti-torque assembly 10 in a different arrangement. In FIG. 5F, all of the four fans 20 are pivoted relative to the tail boom 108 to be in the second configuration where their fan axes 24 are oriented horizontally. In FIG. 5F, the fans 20 are pivotable simultaneously together relative to the tail boom 108. The fan axes 24 of the fans 20 are disposed in the fan body plane FBP. In FIG. 5F, all of the fans 20 in the second configuration are operable to generate the first horizontal thrust vector TH1 to contribute to driving the helicopter 100 in forward flight. The fans 20 in the second configuration may also be operable to generate thrust in a direction opposite to the first horizontal thrust vector TH1 to contribute to decelerating or braking the helicopter 100 in flight or taxi modes. Thus, in FIG. 5F, all of the fans 20 are used to push the helicopter 100. During forward flight, when the anti-torque requirements are lower, this may allow for using all the fans 20 at their full potential.

Referring to FIG. 2A, there is disclosed a method of changing the attitude of the helicopter 100. The method includes pivoting one or more of the fans 20 relative to the tail boom 108 to orient the fan axis 24 of the one or more fans 20 upright. The method includes generating thrust with the one or more fans 20 in an upward direction or a downward direction to cause the helicopter 100 to pitch and/or roll.

Referring to FIG. 2A, there is disclosed a method of providing anti-torque to the helicopter 100. The method includes generating horizontal thrust with some of the fans 20 to provide anti-torque to the helicopter 100. The method includes pivoting one or more different fans 20 relative to the tail boom 108 to orient an axis 24 of the one or more different fans 20 upright. The method includes generating thrust with the one or more different fans 20 in a vertical direction to cause the helicopter 100 to pitch and/or roll.

The pivoting movement of the fans 20 described above may be controlled by an operator of the helicopter 100. In a fly-by-wire configuration, the pivoting movement may be controlled by a logic in a flight control computer that calculates the position of the anti-torque assembly 10 and for independently controlling individual fan speeds to position the anti-torque assembly 10 for optimum thrust angle, as well as optimum thrust magnitude. The thrust generated by the fans 20 can operate in conjunction or coordination with other thrust-producing components of the helicopter 100, like the main rotor, to achieve the desired flight or attitude control.

Reference is made to U.S. Pat. No. 10,377,479 B2 and to US patent application 2017/0349274 A1, both naming Bell Helicopter Textron Inc. as assignee, and the entire contents of both of which are incorporated by reference herein.

The above description is meant to be exemplary only, and one skilled in the art will recognize that changes may be made to the embodiments described without departing from the scope of the invention disclosed. For example, although the fans 20 are described as being electrically-driven, they may be provide with another source of motive power, such as hydraulic fluid. In such a configuration, the fans 20 have a hydraulic motor supplied by flexible hydraulic lines and are hydraulically-driven. Such an arrangement of the fans 20 may be referred to as "Hydraulically-Distributed Anti-Torque" or HDAT. Some of the fans 20 may be hydraulically-driven while other fans 20 may be electrically-driven. A same fan 20 might be primarily electrically-driven and have a hydraulic power back-up, or vice versa. Still other modifications which fall within the scope of the present invention will be apparent to those skilled in the art, in light of a review of this disclosure, and such modifications are intended to fall within the appended claims.

The invention claimed is:

1. A helicopter, comprising:
a fuselage and a tail boom extending therefrom; and
a plurality of fans pivotably mounted to the tail boom, the fans having fan blades rotatable about a fan axis, one or more of the fans being pivotable relative to the tail boom to a first configuration, the fan axes of the fans in the first configuration having an upright orientation, the one or more fan axes of one or more different fans of the plurality of fans of the tail boom such that said one or more different fans are operable to generate thrust to provide anti-torque to the helicopter.

2. The helicopter of claim 1, wherein one or more of the fans are pivotable relative to the tail boom to a second configuration, the fan axes of the fans in the second configuration having a horizontal orientation.

3. The helicopter of claim 1, wherein the tail boom extends along a longitudinal axis, a tail boom plane being upright and the longitudinal axis lying in the tail boom plane, the fan axes of the fans in the first configuration being spaced horizontally from the tail boom plane.

4. The helicopter of claim 1, wherein the tail boom extends along a longitudinal axis, a tail boom plane being upright and the longitudinal axis lying in the tail boom plane, the fan axes of the fans in the first configuration aligned with the tail boom plane.

5. The helicopter of claim 1, wherein the one or more pivotable fans includes one or more pairs of pivotable fans, the pairs of pivotable fans being pivotable together relative to the tail boom.

6. The helicopter of claim 1, wherein the one or more fans are pivotable relative to the tail boom to the first configuration and operable to generate thrust to change an attitude of the helicopter.

7. The helicopter of claim 1, wherein the one or more fans are pivotable relative to the tail boom to the first configuration and operable to generate thrust to change an attitude of the helicopter, and different fans are pivotable relative to the tail boom to a second configuration, the fan axes of the fans in the second configuration having a horizontal orientation, the fans in the second configuration operable to generate thrust to drive or brake the helicopter.

8. The helicopter of claim 1, wherein the fans are variable-thrust fans.

9. The helicopter of claim 1, wherein one or more of the fans have fan blades rotatable about the fan axis to generate thrust in a first thrust direction and in a second thrust direction opposite to the first thrust direction.

10. The helicopter of claim 1, wherein the plurality of fans are electrically-driven, the fans comprising a motor housing pivotably mounted to the tail boom and housing an electric motor, the fan blades extending radially from the motor housing and rotatable by the electric motor.

11. The helicopter of claim 1, wherein the one or more pivotable fans are pivotable independently of another fan.

12. The helicopter of claim 11, wherein two fans are pivotable relative to the tail boom to the first configuration, the fan axes of the two fans being disposed on opposite sides of a tail boom plane.

13. The helicopter of claim 1, wherein the tail boom comprises a fin at an aft end of the tail boom, the fin having a fin body between an upper end of the fin and a lower end of the fin, the fin body having a plurality of fan openings extending therethrough, each of the plurality of fans disposed in one of the plurality of fan openings in the fin body.

14. The helicopter of claim 13, wherein the fin has struts extending from the fin body to the fans, the struts pivotable relative to the fin body to displace the fans to at least the first configuration.

15. The helicopter of claim 14, wherein the fin body lies in a fin body plane being upright, the struts pivotable relative to the fin body to displace the fans to be spaced horizontally from the fin body plane.

16. The helicopter of claim 14, wherein the fin body lies in a fin body plane being upright, the struts pivotable relative to the fin body to displace the fans to position the fan axis in the fin body plane.

17. The helicopter of claim 14, wherein the struts define a strut axis, the struts being rotatable about the strut axis.

18. An anti-torque assembly for a helicopter having a tail boom, the anti-torque assembly comprising:
a plurality of fans pivotably mountable to the tail boom and having fan blades rotatable about a fan axis, one or more of the plurality of fans being pivotable relative to the tail boom to a first configuration, the fan axes of the fans in the first configuration having an upright orientation and operable to one or both of pitch and roll the helicopter, and different fans of the plurality of fans of the tailboom operable to generate thrust to provide anti-torque to the helicopter.

19. The anti-torque assembly of claim 18, wherein one or more of the fans are pivotable relative to the tail boom to a second configuration, the fan axes of the fans in the second configuration having a horizontal orientation.

20. A method of changing an attitude of a helicopter having fans pivotably mounted at an aft end of a tail boom, the method comprising:
pivoting one or more of the fans relative to the tail boom to orient an axis of the one or more fans upright;
generating thrust with the one or more fans in an upward direction or a downward direction to cause the helicopter to one or both of pitch and roll; and
generating thrust with one or more different fans of the tail boom in a horizontal direction to provide anti-torque to the helicopter.

21. The method of claim 20, wherein generating thrust includes generating a same thrust in a same direction with each of the one or more fans to cause the helicopter to pitch.

22. The method of claim 20, wherein pivoting the one or more of the fans relative to the tail boom includes pivoting a first fan to one side of the tail boom and pivoting a second fan to another side of the tail boom, and generating thrust includes generating a first vertical thrust with the first fan and generating a second vertical thrust with second fan different than the first thrust to cause the helicopter to roll.

23. The method of claim 20, wherein pivoting the one or more of the fans relative to the tail boom includes pivoting a first fan to one side of the tail boom and pivoting a second fan to another side of the tail boom, and generating thrust includes generating a first thrust with the first fan and generating a second thrust with second fan different than the first thrust to cause the helicopter to pitch and to roll.

24. The method of claim 20, wherein pivoting one or more of the fans relative to the tail boom includes pivoting one of the fans independently of pivoting another fan.

25. The method of claim 20, wherein pivoting one or more of the fans relative to the tail boom includes pivoting the fans in pairs relative to the tail boom.

26. A method of providing anti-torque to a helicopter having fans pivotably mounted at an aft end of a tail boom, the method comprising:
- generating horizontal thrust with some of the fans to provide anti-torque to the helicopter;
- pivoting one or more different fans relative to the tail boom to orient an axis of the one or more different fans upright; and
- generating thrust with the one or more different fans in a vertical direction to cause the helicopter to one or both of pitch and roll.

27. The method of claim 26, wherein generating thrust includes generating a same thrust in a same direction with each of the one or more different fans to cause the helicopter to pitch.

\* \* \* \* \*